United States Patent [19]

Smith, Jr. et al.

[11] 4,343,039

[45] * Aug. 3, 1982

[54] DICTATION-TRANSCRIPTION METHOD AND SYSTEM

[75] Inventors: Jack E. Smith, Jr.; Paul C. Mason, both of Thomaston, Ga.

[73] Assignee: Lanier Business Products Co., Inc., Atlanta, Ga.

[*] Notice: The portion of the term of this patent subsequent to Feb. 3, 1998, has been disclaimed.

[21] Appl. No.: 973,699

[22] Filed: Dec. 27, 1978

Related U.S. Application Data

[63] Continuation of Ser. No. 781,359, Mar. 25, 1977, Pat. No. 4,249,041.

[51] Int. Cl.³ .............................................. G11B 27/10
[52] U.S. Cl. ........................................ 369/28; 369/41; 360/72.2; 360/74.4; 360/60
[58] Field of Search ................ 360/60, 74.4, 72.2, 360/13, 71; 179/100.1 DR, 100.1 VC; 369/28, 41

[56] References Cited

U.S. PATENT DOCUMENTS

| | | | |
|---|---|---|---|
| 3,171,902 | 3/1965 | Jones | 179/100.1 DR |
| 3,648,249 | 3/1972 | Goldsberry | 179/100.1 DR |
| 3,706,859 | 12/1972 | Nye | 179/100.1 DR |
| 3,869,720 | 3/1975 | Ohira | 179/100.1 DR |
| 3,916,121 | 10/1975 | Stuzzi | 179/100.1 DR |
| 4,007,491 | 2/1977 | Bolich | 179/100.1 DR |
| 4,024,354 | 5/1977 | Bolich | 179/100.1 DR |
| 4,041,249 | 8/1977 | Matz | 179/100.1 DR |

Primary Examiner—Bernard Konick
Assistant Examiner—Alan Faber
Attorney, Agent, or Firm—Jones & Askew

[57] ABSTRACT

A dictation-transcription method and system in which dictated material and instructions concerning the dictated material for use during the transcribing of the dictated material are separately recorded on a recording medium along with indexing signals which include indexing signals identifying the location on the recording medium of the separately recorded instructions concerning dictated material. The recording system and method permit the recording of instructions at any location on the recording medium relative to the dictated material including a location along the length of a recording medium which is the same as the location of the dictated material to which an instruction relates without obliterating any of the dictated material, while at the same time preventing the inadvertent placing of the recording system in a recording mode of operation following the recording of an instruction which would cause dictated material to be inadvertently obliterated. In the transcribing of the dictated material, the system and method provide for the selective transfer of the audio circuit through which the dictated material is being transcribed from the dictated material to an instruction with respect to the dictated material when a signal is heard indicating that there are instructions concerning the dictated material on the recording medium.

25 Claims, 5 Drawing Figures

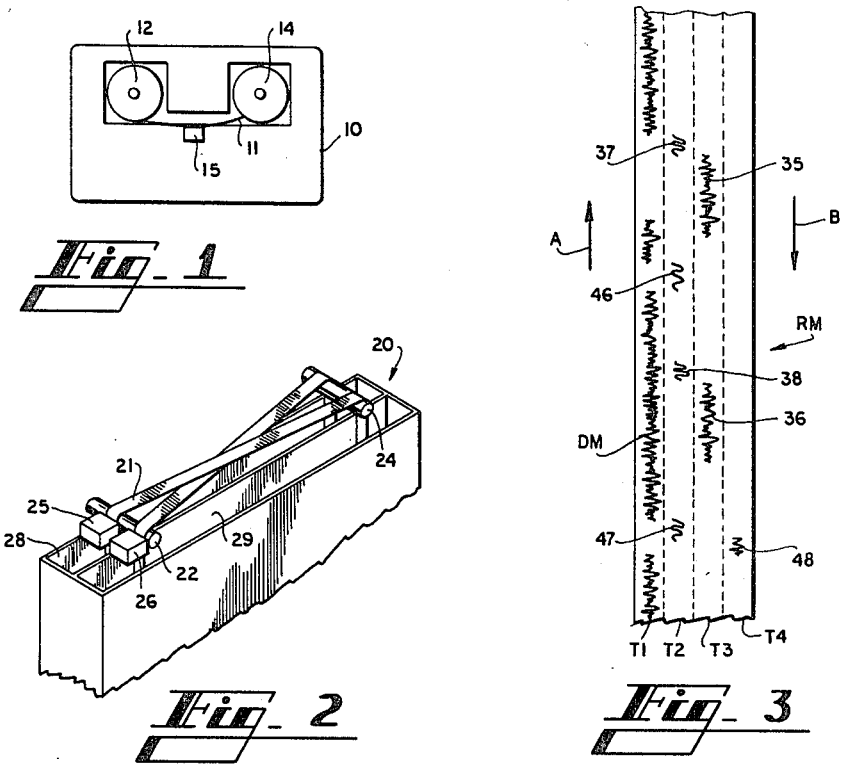
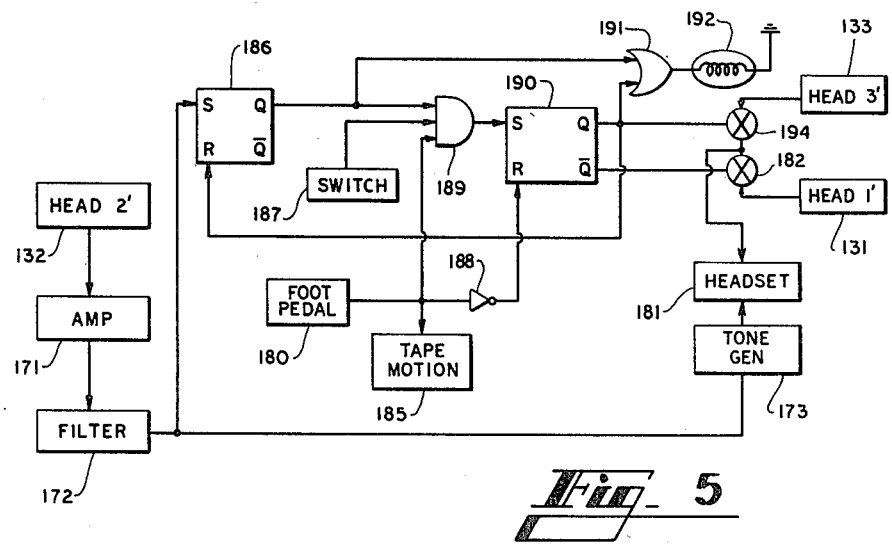

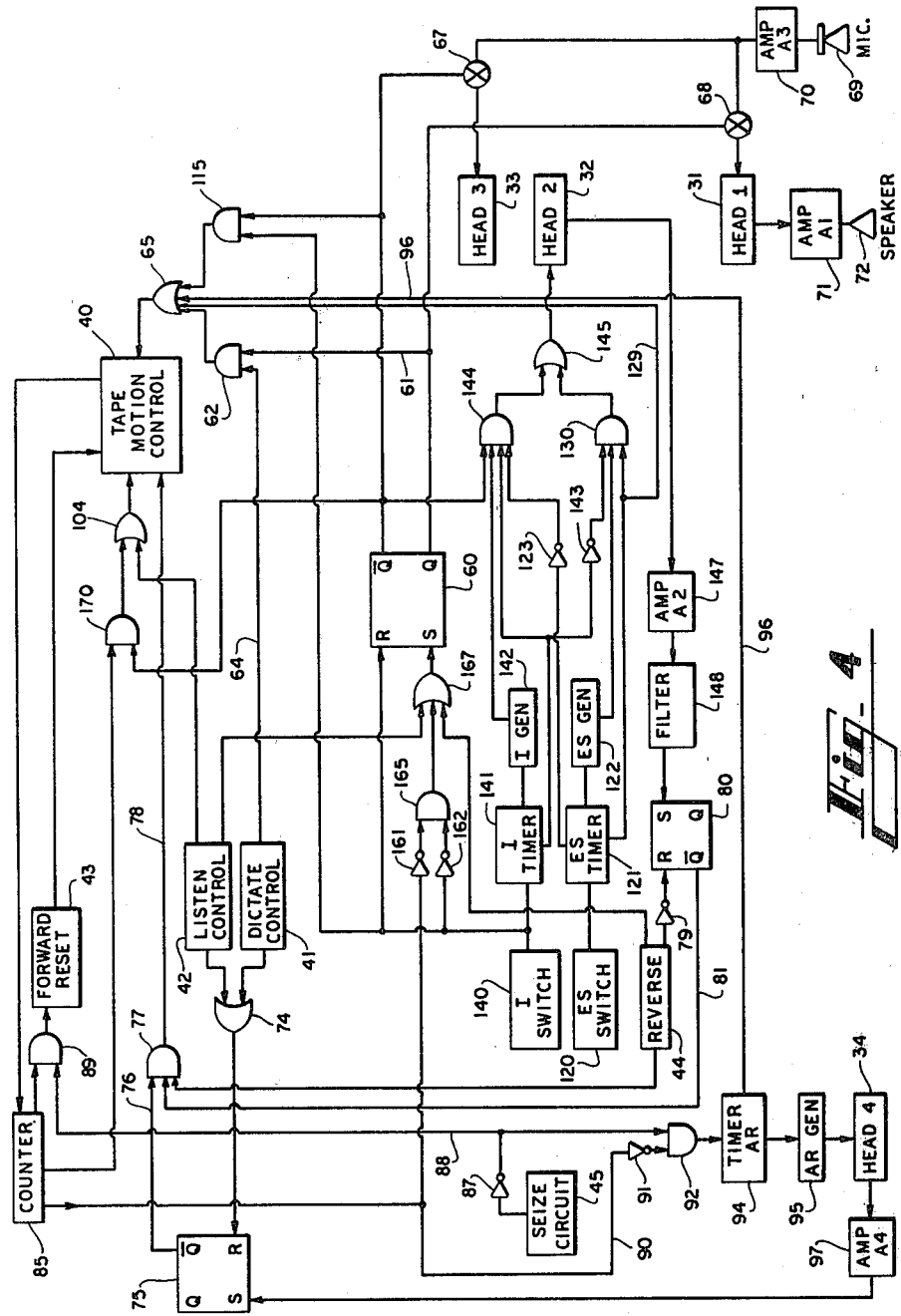

DICTATION-TRANSCRIPTION METHOD AND SYSTEM

This is a continuation of application Ser. No. 781,359, filed Mar. 25, 1977, now U.S. Pat. No. 4,249,041, issued Feb. 3, 1981.

BACKGROUND OF THE INVENTION

1. Field of the Invention

This invention relates to a method of and a system for recording dictated material such as speech on a recording medium and for subsequently transcribing the dictated material from the recording medium and more particularly, to a method of and a system for recording dictated material and instructions concerning the dictated material on the same recording medium without the recording of the instructions obliterating any of the dictated material recorded thereon or otherwise interfering with the integrity of the recorded material.

2. Discussion of the Prior Art

It is known in the art to record dictated material to be transcribed and instructions concerning the dictated material on the same recording medium along with indexing signals to indicate the presence of the instructions and to indicate the end of a unit of dictated material. Representative of such prior art recording systems are the recording systems disclosed in U.S. Pat. No. 4,007,491 issued on Feb. 8, 1977. However, certain problems have been encountered with these and other prior art recording systems.

For example, in some of these prior art recording systems, the dictated material and instructions concerning dictated material are recorded on the same track of the recording medium with the result that instructions can be recorded only as an alternative to dictated material if the obliterating of dictated material is to be avoided. Thus, the instructions will usually follow the dictated material to which they relate and may follow the dictated material to which they relate by a substantial period of time with the result that the dictated material has frequently been transcribed before instructions concerning it have been reached on the recording medium.

Among the prior art attempts to avoid this problem is a prior art recording system in which an instruction signal is recorded on the recording medium in a track which is separate from that track in which the dictated material and instructions are recorded. While these attempts enable instructions with respect to dictated material and dictated material to which said instructions relate to be located on the recording medium, they do not provide for dictated material and instructions concerning the dictated material to be located at substantially the same location along the length of a recording medium.

One prior art attempt to avoid this problem with prior art recording systems has been to record an instruction indexing signal on the same track of a recording medium as the dictated material and to record instructions concerning the dictated material on a different track of the recording medium. The difficulty with this prior art recording system is that the recording of the instruction indexing signal on the same track as the dictated material will result in the obliteration of dictated material if the instructions are with respect to dictated material which has been previously recorded and which has been followed by additional dictated material. Thus, in this prior art recording system, instructions can only be provided with respect to dictated material which is to be dictated immediately following the instructions or with respect to dictated material which has been dictated immediately prior to the instructions without causing the obliteration of dictated material by the instruction indexing signal.

Accordingly, in this and other prior art recording systems, it is difficult if not impossible for instructions to be entered with respect to previously dictated material by placing the recording system in a reverse mode of operation until the previously dictated material is reached, by listening to the previously dictated material, and by entering an instruction with respect to the previously dictated material at the same location along the length of the tape as the previously dictated material without dictated material being obliterated either by the instruction or by the instruction indexing signal indicating the presence of the instructions on a different track on the recording medium. Moreover, even if the obliteration of dictated material by instructions or an instruction indexing signal could be tolerated in these prior art recording systems, there is always the danger in these prior art recording systems that the recording system will be placed in its recording mode of operation after the instruction has been recorded on the recording medium with the result that previously dictated material will be obliterated by the recording of additional dictated material.

SUMMARY OF THE INVENTION

The invention disclosed herein overcomes these and other problems encountered with prior art recording systems in that it provides a method of and a system for the recording of dictated material, instructions concerning the dictated material, and instruction indexing signals indicating the presence of the instructions with respect to the dictated material on a recording medium including a plurality of tracks, said instruction indexing signals and instructions being recorded on tracks of the recording medium other than the track on which the dictated material is recorded. Furthermore, the invention provides for the recording medium to be returned to its farthest point of advance during previous recording of dictated material while preventing the recording of new dictated material so as to insure that new dictated material is not inadvertently recorded over previously recorded dictated material following the recording of instructions.

Thus, in an embodiment of the invention disclosed herein, an instruction indexing signal may be placed in a different track of the recording medium but at the same location along the length of the recording medium as the dictated material to which an instruction relates and the instruction may be placed in a different track from the instruction indexing signal and the dictated material at a location along the length of the recording medium immediately following the instruction indexing signal. Accordingly, in the transcribing of dictated material the embodiment of the invention provides for an instruction indexing signal to be heard as a tone during the transcribing of dictated material and for instructions concerning the dictated material being transcribed or about to be transcribed to be selectively listened to when a tone is heard. However, even though instructions with respect to dictated material are associated along the length of the recording medium with the dictated material and may be selectively accessed when an instruction indexing signal associated with the dictated material along the length of the recording medium is heard, neither the instructions nor the instruction indexing signal can obliterate any of the dictated material or in any other way interfere with the recording or the transcribing of the dictated material.

With respect to the recording of dictation, these improvements are provided in a recording system having a recording mode of operation during which dictated material is recorded on a first track of a plurality of tracks on a recording medium as the recording medium moves in a first direction, a reverse mode of operation in which the recording medium is moved in a second direction opposite to the first direction in order that previously dictated material may be reviewed, and a listening mode of operation in which previously dictated material may be listened to after the reverse mode of operation. The improvement of the present invention comprises a signal recording means independent of said recording mode for recording an instruction indexing signal in a second track of said recording medium, and an instruction recording control means responsive to said signal recording means and independent of said recording mode for recording voice-generated instructions in one of said tracks of said recording medium other than said first track. The invention further comprises a return means responsive to the termination of recording of instructions for returning said medium to its farthest point of advance prior to the recording of instructions, and disabling means for rendering said recording mode inoperative during recording of instructions and until said farthest point of advance is reached.

The system also provides for the transcribing of material recorded on the recording medium, and includes means for converting said instruction indexing signals to perceivable output signals, and means responsive to the converting of said instruction indexing signals and selectively operable for converting said voice-generated instructions to audible output signals corresponding to said voice-generated instruction signals.

When embodied in a method, the invention includes the steps of selectively recording an instruction indexing signal in a second track of said plurality of tracks on said recording medium, and subsequently recording voice-generated instructions in response to the recording of said instruction indexing signal in one of said plurality of tracks other than said first track. The instruction indexing signals and instructions may be recorded at any point along the recording medium relative to recorded dictated material. The method of transcribing of the present invention includes the steps of converting instruction indexing signals sensed on said recording medium into perceivable output signals, and, responsive to the converting of said instruction indexing signals, selectively converting said instructions recorded on said medium into audible output signals corresponding to said voice-generated instructions.

BRIEF DESCRIPTION OF THE DRAWING

These and other features and advantages of the invention will be more clearly understood from the following detailed description and the accompanying drawing in which:

FIG. 1 is a schematic plan view of a dictation-transcription system of the type which uses a recording medium having a discrete length and in which the invention disclosed herein may be embodied;

FIG. 2 is a schematic perspective view of a dictation-transcription system of the type which uses an endless recording medium and in which the invention disclosed herein may be embodied;

FIG. 3 is a graphic representation of a portion of a recording medium in an embodiment of the invention disclosed herein;

FIG. 4 is a schematic representation illustrating the recording portion of an embodiment of the invention disclosed herein which may be embodied in the dictation-transcription system of FIG. 1 or in the dictation-transcription system of FIG. 2; and FIG. 5 is a schematic representation illustrating the transcribing portion of an embodiment of the invention disclosed herein which may be embodied in the dictation-transcription system of FIG. 1 or in the dictation-transcription system of FIG. 2.

DESCRIPTION OF AN EMBODIMENT

Those skilled in the art will recognize the dictation-transcription system shown in FIG. 1 as a dictation-transcription system 10 which provides for the recording and transcribing of dictated material on a recording medium 11 having a discrete length which is transferred from one spool 12 to another spool 14 during the recording or transcribing of dictated material. It will be understood by those skilled in the art that the spools 12 and 14 may be separate reels or may be spools within a tape cassette. Moreover, those skilled in the art will understand that a dictation-transcription system such as shown in FIG. 1 will have appropriate controls for providing various modes of operation during the recording of dictated material and appropriate controls for providing various modes of operation during the transcribing of dictated material and that frequently separate dictation-transcription systems 10 will be used for the recording of dictated material and for the transcribing of dictated material.

Similarly, those skilled in the art will recognize the dictation-transcription system shown in FIG. 2 as a dictation-transcription system of the type in which an endless length of recording medium 21 is transferred from one bin 28 to another bin 29 during the recording of dictated material on the recording medium 21 and is transferred from the bin 29 to the bin 28 during the transcribing of dictated material from the recording medium 21. Moreover, those skilled in the art will understand that the recording of dictated material with one or more recording heads 25 is accomplished by various controls (not shown) which provide various modes of operation and that the transcribing of dictation with one or more transcribing heads 26 is accomplished by various controls that also provide various modes of operation.

Once the invention disclosed herein is understood, it will be further understood by those skilled in the art that it may be embodied with the appropriate arrangement of head 15 and controls in a dictation-transcription system of the type shown in FIG. 1 or of heads 25 and 26 and controls in a dictation-transcription system of the type shown in FIG. 2 or in other types of dictation-transcription systems. Regardless of the type of dictation-transcription system in which the invention disclosed herein is embodied, one or more heads 15, 25 and 26 is arranged for the recording of four separate tracks on a recording medium 11 or 21 as shown in FIG. 3. From FIG. 3, it will be seen that track T1 of the recording medium RM has recorded therein the dictated material DM and that track T3 of the recording medium RM has recorded therein instructions 35, 36 concerning the dictated material DM.

Also from FIG. 3, it will be noted that track T2 of the recording medium RM has recorded therein instruction indexing signals 37 and 38 and end indexing signals 46 and 47. Assuming that the recording medium RM moves in the direction indicated by the arrow A in FIG. 3 during the recording of the dictated material DM, it will also be understood from FIG. 3 that an instruction indexing signal 37, 38 on the track T2 immediately precedes an instruction 35, 36, respectively, in track T3. However, it will also be understood that while an instruction indexing signal such as 37 may appear in the track T2 immediately following dictated material DM in the track T1, it may also appear such as at 38 in the track T2 where there is dictated material DM in the track T1.

Similarly, it will also be understood that an instruction such as 35 may occur in a length of the recording medium RM in which there is no dictated material DM in the track T1 or it may occur, such as at 36, in a length of a recording medium RM having dictated material DM in the track T1. When the invention disclosed herein is fully understood, it will be apparent to those skilled in the art that the location of an instruction signal in the track T2 and of an instruction DM in the track T3 of the recording medium RM relative to dictated material DM in the track T1 of the recording medium RM is a matter of choice with the user of the dictation-transcription system.

For example, the position of the instruction signal 37 and the instruction 35, along the length of the recording medium RM in FIG. 3 will usually occur when the user of the dictation-transcription system disclosed herein desires to provide an instruction immediately following dictated material and prior to continuing the dictated material DM. On the other hand, the positioning of an instruction indexing signal such as 38 and of dictated instructions such as 36 relative to the dictated material DM along the length of the recording medium RM will usually occur when the user of the dictation-transcription system has moved the recording medium RM in a reverse direction indicated by the arrow B in FIG. 3 to review the dictated material DM has determined that a correction or instruction should be provided, and has placed an instruction indexing signal 38 at a location along the length of the recording medium RM which corresponds to the location along the length of the recording medium RM of the dictated material indicated by arrow B to which the instruction 36 to follow the instruction indexing signal 38 relates. However, as it will be understood from the following description of an embodiment of the invention, the invention disclosed herein permits instruction signals and dictated instructions to be placed at any location along the length of recording medium RM relative to dictated material DM without obliterating or otherwise interfering in any way with the dictated material DM.

FIG. 3 also shows the recording of an end indexing signal 46, 47 on the track T2 of the recording medium RM and of an anti-reverse or AR signal 48 on the track T4 of the recording medium RM. Those skilled in the art will understand that an end signal 46, 47 provides a means for identifying the end of a unit of dictation and that as a result such signals occur in the track T2 at 46 and 47 between units of dictation DM on the track T1. Similarly, those skilled in the art will understand that an anti-reverse (AR) signal 48 separates the dictation by one user of a dictation-transcription system from that of another user of the dictation-transcription system so that the second user of the dictation-transcription system cannot reverse the recording medium RM in the direction B indicated in FIG. 3 into the dictation of the first user of the dictation-transcription system.

The recording of dictated material DM, dictated instructions 35, 36 and instruction indexing signals 37, 38 on a recording medium RM as described above will be further understood by considering FIG. 4 which shows the recording portion of an embodiment of the invention disclosed herein, and FIG. 5 which shows the transcribing portion of an embodiment of the invention disclosed herein. In FIG. 4, a plurality of heads 31-34 corresponding to the tracks T1-T4 of the recording medium RM are shown for convenience of explanation. However, it will be understood that the four heads 31-34 may be a single four-track head or other suitable arrangement which will provide a recording function with respect to tracks T1-T4 of a recording medium RM and a listening function with respect to tracks T1-T4 of the recording medium RM.

FIG. 5 is similar to FIG. 4 in that heads 131-133 are shown as separate heads for convenience of explanation even though their function may be provided by a single three track listening-recording head or other similar arrangement. Furthermore, it should be understood that when the invention disclosed herein is embodied in a dictation-transcription system of the type shown in FIG. 1, the heads 131-133 of FIG. 5 may be the same heads as the heads 31-33 in FIG. 4 since dictation-transcription systems of the type shown in FIG. 1 are frequently arranged so that a single unit 10 may be alternately used for the recording of dictation and for the transcribing of dictation. However, in a dictation-transcription system of the type shown in FIG. 2, the heads 131-133 of FIG. 5 will generally be separate from the heads 31-34 of FIG. 4 since dictation-transcription systems of the type shown in FIG. 2 are generally arranged for the simultaneous recording of dictation and transcribing of dictation. Thus, the manner in which heads 31-34 and 131-133 are arranged to record or be responsive to dictated material DM, instruction indexing signals 37, 38, and dictated instructions 35, 36 in tracks T1, T2 and T3 of a recording medium RM will depend upon the particular type of dictation-transcription system in which the invention disclosed herein is embodied.

From both FIGS. 4 and 5, it will be seen that controls which are customarily provided with respect to dictation-transcription systems of various types have been simply indicated in these figures by an appropriately labeled block. For example, the tape motion means 40 in FIG. 4 may be any of a plurality of means known to those skilled in the art for causing a recording medium RM to move in a recording direction A in response to the operation of an appropriate dictate control 41, an appropriate listening control 42 or an appropriate forward reset control 43 and to move in the direction B indicated in FIG. 3 in response to the operation of an appropriate reverse control 44. Similarly, it will be understood by those skilled in the art that the seize condition 45 shown in FIG. 4 could be the particular condition which is often provided in a dictation-transcription system where it must be rendered operative by a handset being removed from a cradle or by other similar means to enable various operating controls of the dictation system, such as the dictate control 41, the listen control 42, the instruction switch 140, the end signal switch 120, and the reverse control 44.

Furthermore, those skilled in the art will understand that the tape motion means 185 shown in FIG. 5 is also any conventional means for providing motion of a recording medium RM in the direction A shown as FIG. 3 in response to a foot pedal 180 or other similar device used to control the motion of the recording medium RM during the transcribing of the dictating material DM, and that the headset 181 is a conventional headset providing an audio output from a head. Finally, it will be understood that the foot pedal 180 and the tape motion means 185 also serve in conventional manner to provide motion of a recording medium RM in the direction B shown in FIG. 3 so that a reverse as well as a transcribing mode of operation is provided to the dictation-transcription system.

The recording portion of a dictation-transcription system embodying the invention disclosed herein as shown in FIG. 4 will be best understood by considering that a seize condition has been provided at 45. The seize condition circuit 45 is connected to the various operating controls as explained above by appropriate connections (not shown). At this point, as will be apparent from the explanation to follow, a flip-flop 60, as shown in FIG. 4, is in its set state and is emitting an output signal from its Q output and no signal from its -Q output.

The Q output signal from flip-flop 60 provides one of the necessary input signals to AND gate 62 along line 61. The operation of the dictate control 41 provides the other input signal to AND gate 62 along line 64, so that an output signal from AND gate 62 will pass through an OR gate 65 and cause the tape motion means 40 to provide a recording mode of operation of the dictation-transcription system in which the recording medium RM is moved in the direction A as shown in FIG. 3 relative to heads 31–34.

At the same time, the Q output signal of the flip-flop 60 enables a conventional electronic switch 68 to pass audio from a microphone 69 through an amplifier 70 to the head 31 which is positioned to record the audio input as dictated material in the track T1 of the recording medium RM as the recording medium RM is being moved in the direction A by the tape motion means 40.

The operation of the dictate control 41 as described above to cause the tape motion means 40 to move the recording medium RM in the forward direction A of FIG. 3 also sends a signal through the OR gate 74 to the reset input of a flip-flop 75 which in this condition provides a -Q output signal along line 76 to an AND gate 77. A flip-flop 80 is in its reset condition at this stage of the operation of the dictation-transcription system prior to operation of the reverse control 44, because the absence of output from reverse control 44 is sensed by INVERT circuit 79 which emits a signal to reset flip-flop 80. As a result, a second input signal to the AND gate 77 is provided from the -Q output of the flip-flop 80 along line 81. Operation of the reverse control 44 provides the final input to the AND gate 77, which then signals tape motion control 40 along line 78 to provide a conventional reverse mode of operation of the dictation-transcription system in which the recording medium RM is moved in the reverse direction B. As seen in FIG. 4, the listen control 42 is connected to the tape motion means 40 through an OR gate 104 so that subsequent to the operation of the reverse control 44, previously-dictated material may be listened to through the head 31, the amplifier 71 and the speaker 72 by operation of the listen control 42 which sends a signal through OR gate 104 to cause the recording medium RM to move in the direction A shown in FIG. 3. Alternatively, after operation of the reverse control 42, the dictate control 41 may be operated to allow previously-recorded dictated material DM to be replaced by new dictated material DM. It will also be seen that listen control 42, like dictate control 41, provides an enabling input to AND gate 77 through OR gate 74 and flip-flop 75. Thus, the reverse mode described may follow either dictation or review of dictated material DM by the operator.

As thus far described, a dictation-transcription system embodying the invention disclosed herein provides a conventional recording mode of operation in which dictated material DM is recorded on a recording medium RM, and a conventional reverse mode of operation which enables dictated material to be reviewed during a subsequent listen mode of operation or corrected during a subsequent dictate mode of operation following an intermediate reverse mode.

The dictation-transcription system disclosed herein also provides a conventional forward reset mode of operation which would occur in connection with the operation of the dictation-transcription system thus far described in the event that the seize condition 45 is terminated following a reverse mode of operation with the recording medium RM in a position other than that corresponding to its farthest advance during a previous dictating mode of operation. Those skilled in the art will understand that with the recording medium in this position, the subsequent operation of the dictation-transcription system could result in previously-recorded dictated material DM being obliterated. The purpose of the forward reset mode of operation is therefore to insure that subsequent recording of dictated material is on unused portions of the recording medium.

Those skilled in the art will also understand that the usual means of providing a forward reset mode of operation is to provide a device such as a counter 85 which provides a voltage output when its counter is at other than zero, which counts upward from zero during a reverse mode of operation of the dictation-transcription system and which counts back down towards zero during a subsequent listen mode of operation or dictate mode of operation of the dictation-transcription system. Another device frequently used for providing a forward reset mode of operation in a dictation-transcription system of the type shown in FIG. 2 is a bin switch of the type shown in U.S. Pat. No. 3,708,633 which provides a particular electrical output when a recording medium is not at its point of farthest advance during a previous dictate mode of operation.

Thus, the counter 85 in the embodiment of the invention disclosed herein is merely representative of a variety of devices which will provide an output to an AND gate 89 when the seizure condition 45 of the dictation-transcription system has been terminated with the recording medium RM improperly positioned for subsequent recording. The other input to the AND gate 89 is from the seize condition 45 through the INVERT circuit 87 along line 88. Thus, the forward reset control 43 responds to a combination of the absence of the seize condition 45 and an output signal from the counter 85 to cause the tape motion control 40 to move the recording medium RM in the direction A of FIG. 3 until the counter 85 counts back to zero and the output from the counter 85 terminates, indicating that the recording medium RM has been returned to the position of furthest advance during the previous recording mode of operation of the dictation-transcription system. The absence of a signal from counter 85 terminates the output signal from the AND gate 89, thereby disenabling the forward reset control 43 and ending the motion of the recording medium by the tape motion control 40.

It should be noticed from FIG. 4 that the absence of an output signal from the counter 85 provides an input signal along line 90 through an INVERT circuit 91 to an AND gate 92 having as its other enabling input a signal through INVERT circuit 87 which senses the absence of the seize condition 45. Thus, if there is no output from the counter 85 because the recording medium RM is at its farthest point of advance during a dictating mode of operation when the seizure condition 45 is terminated, the termination of the seizure condition 45 causes a signal to be emitted from AND gate 92 to a timer 94 to provide a signal of predetermined duration to an AR signal generator 95 and to the OR gate 65 along line 96.

The output signal from the timer 94 to the OR gate 65 causes the tape motion means 40 to provide motion of the recording medium RM in the direction A of FIG. 3 while the signal to the AR signal generator 95 is causing an AR signal of predetermined frequency and duration to be sent to the head 34. The head 34 is positioned to record this AR signal on the track T4 of the recording medium RM and it will be understood that an AR signal is recorded each time the seizure condition 45 is terminated so long as there is no output signal from the counter 85. However, it will also be understood that if there is an output from the counter 85 the AR signal 48 will not be recorded on the track T4 of the recording medium RM until the counter 85 has returned to zero as a result of the operation of the forward reset 43.

The use of end indexing signals 46, 47 (FIG. 3) in the recording and transcribing of dictated material DM will be generally understood from U.S. Pat. No. 4,007,491 issued on Feb. 8, 1977. In the embodiment of the present invention disclosed herein, the end signal switch 120 may be any conventional switch mounted on the handset (not shown) of a dictate station (not shown) or at another suitable location which will provide a voltage pulse to a timer 121. In the embodiment of the invention disclosed herein the timer 121 provides an output signal of predetermined duration to an AND gate 130 and to an end signal generator 122, causing it to provide a second output signal of a predetermined frequency to the AND gate 130. The third input to the AND gate 130 is from a timer 141 through an INVERT circuit 143. In terms of the operation of the embodiment of the invention disclosed herein thus far described, there is as yet no output from the timer 141 and as a result the AND gate 130 is enabled by the output signals from the timer 121 and the end signal generator 122 to pass the frequency output signal of the generator 122 through an OR gate 145 to the head 32. It will be understood that the head 32 is positioned relative to the recording medium RM so that the frequency output of the end signal generator 122 is recorded by the head 32 on the recording medium RM in the track T2 as an end signal 46, 47. The timer 121 also provides an output signal along line 129 to OR gate 65 which transmits the signal to the tape motion means 40 which thereby moves the recording medium in the forward or A direction during recording of the end signal 46, 47.

The general use of an end signals 46, 47 recorded in the track T2 of the recording medium RM in the recording and transcribing of dictated material DM is as described in U.S. Pat. No. 4,007,491 which issued on Feb. 8, 1977. In the embodiment of the invention disclosed herein, when the dictation-transcription system is put in a reverse mode of operation by operation of the reverse control 44 the head 32 will respond to an end signal 46, 47 recorded in the track T2 to provide a signal to an amplifier 147. Since the head 32 will also respond to instruction signals 37, 38 from an instruction indexing signal generator 142 recorded on the track T2 as described below, the output of the amplifier 147 is filtered by a filter 148 to eliminate instruction indexing signals from instruction indexing signal generator 142 and to provide a set input to the flip-flop 80 only in response to an end signal 46, 47. Thus, when an end signal 46, 47 is encountered by the head 32 during the reverse mode of operation of the dictation-transcription system described herein, the flip-flop 80 is changed from its reset condition to its set condition with result that one of the enabling voltages at the AND gate 77 for the reverse mode of operation of the dictation-transcription system described above is removed. The reverse mode is thus disenabled whenever an end signal 46, 47 is encountered on track T2 of the recording medium RM.

The reverse mode of operation may be reestablished, however, by placing the reverse control 44 in an inoperative condition to provide an absence of output which is sensed by the INVERT circuit 79, which then provides a reset voltage to reset the flip-flop 80 so as to once again provide an enabling input signal from the flip-flop 80 to the AND gate 77. Thus, when the reverse control 44 is once again operated the tape motion control 40 once again provides motion of the recording medium RM in the direction B shown in FIG. 3. Although it may be necessary to reset the flip-flop 80 several times as described above in order for the recording medium RM to be moved to a point to which the head 32 no longer senses an end signal 46, 47, it will be understood that in the invention disclosed herein, the operator may "bump" through an end signal 46, 47 by repeated on-off operation of the reverse control 44.

The end signals 46, 47 recorded in the track T2 of the recording medium RM thus serve as a means for positioning the recording medium RM during a reverse mode of operation of the dictation-transcription system at the beginning of units of dictation so as to facilitate the review of a particular unit of dictation, while at the same time the dictation-transcription system permits the reverse mode of operation to be continued beyond any particular end signal 46, 47 by the operation of the reverse control 44 as described above. However, at this point it should be noted that when a user terminates the seize condition 45 and thereby generates an anti-reverse or AR signal 48 which has been recorded on the track T4 as described above and when such an AR signal 48 is encountered during the reverse mode of operation of the dictation-transcription system, the head 34 senses the AR signal 48. The head 34 then provides an output through an amplifier 97 to the flip-flop 75 which is thereby placed in a set condition so as to remove the −Q output of the flip-flop 75 which is an enabling input to the AND gate 77.

Thus, as with an end signal 46, 47, an anti-reverse signal 48 will terminate the reverse mode of operation of the dictation-transcription system. However, the dictation-transcription system will not "bump" through an anti-reverse signal 48 in the same manner as it "bumps" through an end signal 46, 47 as described above. Rather, the reverse control 44 will not become operative to provide a reverse mode of operation to the dictation-transcription system through the AND gate 77 after an anti-reverse signal 48 has been encountered by the head 34 in the track T4 of the recording medium RM until the dictate control 41 or listen control 42 has been operated to reset the flip-flop 75 through the OR gate 74. Since the operation of the dictate control 41 or the listen control 42 causes the recording medium RM to move forward in direction A in FIG. 3, subsequent operation of the reverse control 44 will again run the AR signal 48 past head 34. This event terminates the reverse mode of operation in the manner described above. Thus, while the invention disclosed herein provides control access to each unit of dictation recorded on the recording medium RM during a particular interval of time that the dictation-transcription system has been continuously operative, it prevents access to any unit of dictated material DM which was recorded on the recording medium RM during a previous interval of dictation so as to be sure that these previous units of dictated material DM recorded by a previous user of the dictation-transcription system cannot be interfered with or heard by a subsequent user of the dictation-transcription system.

The embodiment of the invention thus far disclosed herein provides the conventional dictate mode of operation, the conventional reverse mode of operation, the conventional listening mode of operation, the conventional forward reset mode of operation, the conventional end signal recording mode, and the conventional AR signal recording mode when seizure of the dictation-transcription system for the recording of dictation has terminated. However, it will also be understood that in the embodiment of the invention disclosed herein, the dictated material is recorded only on the track T1 of the recording medium RM, the AR signal is recorded only on the track T4 of the recording medium RM, and the end indexing signals are recorded only on the track T2 of the recording medium RM. Furthermore, the invention disclosed herein will be fully understood only from a consideration of the arrangement and operation of the embodiment of the invention disclosed herein below to provide instruction indexing signals and instructions in the tracks T2 and T3 of the recording medium RM.

In addition to the end signal switch 120, the invention disclosed herein includes an instruction switch 140 which may be selectively operated by the user of the dictation-transcription system whenever the user desires to record instructions 35, 36 with respect to dictated material DM. As with the end signal switch 120, the instruction switch 140 may be any conventional switch mounted on the handset (not shown) of a dictation station (not shown) or at another convenient location which provides a voltage output when operated. The output signal occurring when the instruction switch 140 is operated resets flip-flop 60 with the result that the flip-flop 60 provides a −Q output. The removal of the Q output of flip-flop 60 removes one of the required enabling input signals from the AND gate 62 so that the dictation-transcription system is no longer operative by the dictate control 41 as described above. The removal of the Q output of the flip-flop 60 also disenables the electronic switch 68 so that the head 31 will no longer record the audio input of the microphone 69. However, the −Q output of the flip-flop 60 resulting from of the operation of the instruction switch 140 causes the electronic switch 67 to connect the head 33 to the microphone 69 while at the same time providing one of the two enabling input signals to an AND gate 115. The operation of the instruction switch 140 will provide the second enabling input to the AND gate 115 which will then send a signal through the OR gate 65 to the tape motion control 40 which will provide motion of the recording medium RM corresponding to that provided by operation of the dictate control 41.

Thus, while operation of the instruction switch 140 has rendered the dictation driving system unresponsive to any attempt to use the dictate control 41 to record dictated material DM through the microphone 69 in the track T1 with the head 31, it has alternatively rendered the dictation-transcription system operative in response to the operation of the instruction switch 140 to record instructions 35, 36 through the microphone 69 in track T3 of the recording medium RM with the recording head 33.

In addition, the operation of the instruction switch 40 has provided an input signal to a timer 141 which in response to this input provides an enabling signal to an AND gate 144. The timer 141 also provides an input signal to an instruction indexing signal generator 142 which in response to this signal provides a signal of a particular frequency to the AND gate 144. A further enabling voltage is provided to the AND gate 144 by the Q output of the flip-flop 60 and the fourth enabling signal to AND gate 144 is provided by INVERT circuit 123 which senses the absence of an output signal from the end signal timer 121.

Accordingly, it will be understood at this point that the operation of the instruction switch 140 will cause a frequency pulse from the instruction indexing signal generator 142, through the AND gate 144 and the OR gate 145, to be recorded by the head 32 in the track T2 of the recording medium RM as the user begins to speak instructions into microphone 69 for recording on the track T3. It will be further understood that the duration of this pulse will be determined by the instruction indexing signal timer 141 and that the frequency of the instruction signal 37, 38 recorded by the head 32 will differ from the frequency of an end signal 46, 47 recorded by the head 32 so that the filter 148 may discriminate between an end signal 46, 47 and an instruction signal 37, 38 as described above.

As long as the instruction switch 140 is operated the tape motion control 40 moves the recording medium RM in direction A shown in FIG. 3 and instructions spoken into the microphone 69 will be recorded by the head 33 in track T3 of the recording medium RM.

Furthermore, it will now be understood that the instruction switch 140 may be operated at any time while there is a seize condition 45 in the dictation-transcription system to cause an instruction indexing signal 37, 38 to be recorded by the head 32 in the track T2 of the recording medium RM and instructions 35, 36 to be subsequently recorded by the head 33 in the track T3 of the recording medium RM. Moreover, it will be understood that regardless of when the instruction switch 140 is operated, neither the instruction indexing signal 37, 38 nor the instructions 35, 36 will obliterate or otherwise interfere with dictated material DM in track T1 of the recording medium RM. Thus, an instruction indexing signal 37, 38 and instructions 35, 36 may be placed at a point along the length of the recording medium RM corresponding to the dictated material DM to which the instructions 35, 36 relate. If the instructions such as 35 have been recorded in the track T3 at the end of the dictated material DM, there will be a gap in the dictated material DM and recording of dictated material DM may continue on an unused portion of the recording medium RM. In this event, there will be no output signal from the counter 85 since the recording medium is beyond its farthest point of advance during the dictating mode of operation of the dictation-transcription system. The absence of an output signal from the counter 85 is sensed by INVERT circuit 161 which then provides one of two enabling input signals to an AND gate 165. The other input to the AND gate 165 is provided by INVERT circuit 162 which senses the absence of a signal from the instruction switch 140 when the instruction switch 140 is rendered inoperative by the user when the user is finished speaking instructions into microphone 69.

Thus, the release of the instruction switch 140 after the recording of the instructions 35 with the recording medium RM in a position for the recording of further dictated material DM causes AND gate 165 to send a signal through an OR gate 167 to set the flip-flop 60. This removes the −Q output and once again provides a Q output from flip-flop 60. The result is that the dictation-transcription system is inoperative to record input from the microphone 69 with the head 32 and is operative to provide the dictate mode of operation and the other conventional modes of operation as described above.

In the event that an instruction indexing signal such as 37 and instructions such as 36 have been recorded by operation of the instruction switch 140 following a reverse mode of operation of the dictation-transcription system because the instructions 36 relate to previously recorded dictated material, it is necessary to avoid the enabling of the dictation-transcription system to provide a dictating mode of operation upon the release of the instruction switch 140 which could result in the inadvertent obliteration of previously recorded dictated material by newly dictated material DM unless the instructions 36 were of sufficient length to return the recording medium RM to its point of farthest advance in the recording mode of operation of the dictation-transcription system. According to the dictation-transcription system of the present invention, if the recording medium RM is not at its point of farthest advance during the dictating mode of operation of the dictation-transcription system when the instruction switch 140 is released, there will be a voltage output from the counter 85 with the result that one of the enabling input signals to the AND gate 165 is missing and the flip-flop 60 will not be set upon the release of the instruction switch 140.

In such a case, continuing −Q output of the flip-flop 60 and the signal from the counter 85 enable an AND gate 170 to provide an input to the OR gate 104 which causes the tape motion control 40 to provide a listening mode of operation for the dictation-transcription system. It will be understood that this listening mode of operation of the dictation-transcription system will continue until the output from the counter 85 terminates because the recording medium RM has been returned to its point of farthest advance during the previous dictation mode of operation of the dictation-transcription system and that when the counter output terminates the flip-flop 60 will be placed in its set condition as described above so as to enable the dictation-transcription system to provide the recording mode of operation and other conventional modes of operation.

Thus, upon the release of the instruction switch 140 subsequent to the recording of instructions 36, the invention disclosed herein either provides the dictating mode of operation or the listening mode of operation depending upon whether or not the recording medium RM is at its point of farthest advance during the dictating mode of operation of the dictation-transcription system at the time the instruction switch 140 is released. Accordingly, the invention disclosed herein not only provides for the recording of instruction signals 37, 38 and instructions 35, 36 in a manner which insures that they will not obliterate or otherwise interfere with dictation DM but it also insures that the dictated material DM will not be inadvertently obliterated or otherwise interfered with subsequent to the recording of an instruction 35, 36. However, in the event that it is desired to operate the dictation-transcription system in the dictating mode of operation or some other conventional mode of operation other than the listen mode of operation subsequent to the recording of an instruction 36 in spite of the risk of obliterating or otherwise interfering with previously recorded dictated material DM, it is only necessary to operate the listen control 42 or the reverse control 44 since as may be seen from FIG. 4, both the listen control 42 and the reverse control 44 provide an input to the OR gate 167 which will place the flip-flop 60 in its set condition.

When the flip-flop 60 is placed in its set condition, one enabling voltage to the AND gate 170 from the −Q output of the flip-flop 60 is removed and control of the tape motion means 40 by the output of the counter 85 is terminated. Moreover, when the flip-flop 60 is in its set condition by operation of listen control 42 or reverse control 44, the dictation-transcription system is enabled to provide the dictating mode of operation and other conventional modes of operation as described above in spite of the output from the counter 85.

While the recording medium RM provided by the dictating portion of the invention disclosed herein has many advantages in the transcribing of dictated material DM over recording media such as those disclosed in U.S. Pat. No. 4,007,491, issued on Feb. 8, 1977, the recording medium RM is particularly useful in the transcribing of dictated messages DM using the transcribing portion of the invention disclosed herein as shown in FIG. 5. As already indicated above, the transcribing portion of the invention disclosed herein has a head 131 responsive to dictated material DM in the track T1 of the recording medium RM, a head 132 responsive to end indexing signals 46, 47 and instruction indexing signals 37, 38 recorded in track T2 of the recording medium RM, and a head 133 responsive to instructions 35, 36 recorded in the track T3 of the recording medium RM. As also indicated above, the transcribing portion of the invention disclosed herein is generally conventional in that operation of foot pedal 180 causes a tape motion means 185 to provide the conventional transcribing mode of operation and reverse mode of operation required for the transcribing of dictated material DM which is heard in a conventional headset 181 having an audio circuit (not shown) connected through the electronic switch 182 to the head 131. However, it should be noted from FIG. 5 that during these conventional modes of operation of the dictation-transcription system, the electronic switch 182 is maintained in a conductive condition by the −Q output of a flip-flop 190.

Furthermore, it should be noted from FIG. 5 that the head 132 reads recorded end indexing signals and instruction indexing signals on track T2 and provides an input to a filter 172 through an amplifier 171. The filter 172 is selected to pass frequencies corresponding to the instruction indexing signals 37, 38 recorded in the track T2 of the recording medium RM. Thus, whenever an instruction indexing signal 37, 38 is encountered by the head 132 in track T2 during the transcribing of dictated material DM in the track T1, the filter 172 provides an output. This output of the filter 172 provides an input to a tone generator 173 which by conventional circuitry (not shown) causes a tone to be heard in the headset 181. In addition, the output of the filter places a flip-flop 186 in its set condition to cause the flip-flop 186 to provide a Q output which through an OR gate 191 causes a lamp 192 to be energized. Accordingly, it will now be understood that when an instruction signal 37, 38 is encountered during the transcribing of dictated material DM, a momentary tone is heard in the headset 181 and the lamp 192 is illuminated to burn continuously until it is extinguished as described below.

Moreover, it will be understood that the transcribing of dictation DM may continue without interruption in spite of the momentary tone in the headset 181 and the lamp 192 being energized. However, in the event that it is desired to listen to the instruction 35, 36 in the track T3 of the recording medium RM corresponding to an instruction signal 37, 38, the foot pedal 180 may be released to stop motion of the recording medium RM in the A direction shown in FIG. 3 and subsequently operated simultaneously with a transverse switch 187.

The transverse switch 187 may be any conventional conveniently located switch that will provide an input to an AND gate 189. The operation of this transverse switch 187 and the foot pedal 180 while the flip-flop 186 is in its set condition as a result of an instruction signal 37, 38 will enable the AND gate 189 to cause the flip-flop 190 to be changed from its reset to its set condition. When the flip-flop 190 is placed in its set condition, it no longer provides an enabling input through electronic switch 182 and now provides an enabling input to the electronic switch 194. In addition, the Q output of the flip-flop 190 which is now being provided serves to reset the flip-flop 186 and to continue to energize the lamp 192 through the OR gate 191 even though the flip-flop 186 has been returned to its reset condition.

Thus, so long as the foot pedal 180 continues to be operated to provide motion of the recording medium RM in direction A of FIG. 3, instructions 25, 26 recorded in the track T3 of the recording medium RM are heard in the headset 181 and the lamp 192 continues to be energized. However, when the foot pedal 180 is released to terminate motion of the recording medium RM in the direction A of FIG. 3, the absence of the output signal provided by the foot pedal 180 will be sensed by an INVERT circuit 188 which will then reset the flip-flop 190.

When this occurs, the lamp 192 is extinguished and dictated material DM recorded in track T1 will once again be heard in the headset 181 upon subsequent operation of the foot pedal 180. Thus, the dictation-transcription system once again returns to providing the conventional transcribing modes of operation.

It will now be understood that regardless of whether the invention disclosed herein is embodied in a dictation-transcription system of the type shown in FIG. 1, the type shown in FIG. 2 or another type, the invention disclosed herein provides a dictation-transcription system in which instructions with respect to dictated material on a recording medium may be recorded at locations which correspond to the dictated material to which the instructions relate and in which these instructions are available during the transcribing of the dictated material in a manner which provides their convenient use in connection with the transcribing of the dictated material. It will be further understood that the invention disclosed herein provides such instructions in a manner which does not interfere with the conventional modes of operation of a dictation-transcription system and which is such as to insure that there is no obliteration or interference with dictated material. Furthermore, it will also be understood that new changes and modifications may be made, and the full use of equivalents resorted to without departing from the scope of the invention as defined in the appended claims.

What is claimed is:

1. A method of recording dictation on a recording medium including a plurality of recording tracks, comprising the steps of moving said medium relative to a recording device in a forward direction;

recording voice-generated dictation signals on a first track of said plurality of tracks while said medium is moving in a forward direction;

selectively moving said medium in a reverse direction relative to said recording device;

subsequent to said reverse moving of said medium again moving said medium in a forward direction while providing an audible output signal corresponding to the voice-generated signals recorded in said first track;

selectively recording an instruction indexing signal independent of voice-generated signals in a second track of said plurality of tracks following any sequence of forward and reverse moving of said medium relative to said recording device;

following recording of said instruction indexing signal, recording a voice generated instruction signal in one of said plurality of tracks other than said first track;

upon termination of said instruction signal recording step, moving said medium in the forward direction until the farthest point along said medium at which dictation signals have previously been recorded in said first track is reached at said recording device; and preventing recording of dictation signals in said first track from the initiation of recording of said instruction indexing signal until said medium has been moved to said farthest point along said medium at which dictation signals have previously been recorded in said first track.

2. The method of claim 1 further comprising the step of:

simultaneously with said indexing signal recording step, preventing recording of voice-generated dictation signals in said first track, and continuing said prevention until the termination of said instruction signal recording step.

3. The method of claim 1 wherein said instruction signal recording step comprises recording said instruction signal in a third track of said plurality of tracks.

4. The method of claim 1 wherein said instruction indexing signal recording step comprises recording a signal within a predetermined frequency range for a predetermined period of time in said second track.

5. The method of claim 1 further comprising the step of
selectively re-enabling recording of dictation signals in said first track prior to the farthest point along said medium at which dictation signals have previously been recorded in said first track.

6. The method of claim 1 wherein said step of moving said medium in the forward direction until the farthest point along said medium at which dictation signals have previously been recorded is reached at said recording device comprises
sensing movement of said medium in a reverse direction and the positioning of said medium at a point of advance prior to the point where said reverse movement began;
sensing said instruction signal recording step; and
upon the sensing of positioning of said medium at a point prior to the point along said medium at which said reverse movement began and the sensing of said instruction signal recording step, moving said medium in the forward direction until the point along said medium at which said reverse movement began is reached at said recording device.

7. The method of claim 1 further comprising the steps of
selectively generating an end indexing signal independent of voice-generated signals and discreet from said instruction indexing signal;
recording said end indexing signal in one of said plurality of tracks other than said first track; and
simultaneously with recording said end indexing signal, moving said medium in the forward direction.

8. The method of claim 7 wherein recording of said end indexing signal is on said second track.

9. The method of claim 8 further comprising the steps of
disabling recording of said instruction indexing signal during recording to said end indexing signal; and
disabling recording of said end indexing signal during recording of said instruction indexing signal.

10. The method of claim 7 wherein said end indexing signal recording step comprises recording said end indexing signal for a predetermined period of time.

11. The method of claim 7 further comprising the steps of
sensing end indexing signals recorded on said medium passing said recording device; and
preventing movement of said medium in a reverse direction when an end indexing signal is present on said medium.

12. The method of claim 11 further comprising the step of
selectively re-enabling movement of said medium in the reverse direction following disabling of said reverse movement upon the sensing of an end indexing signal.

13. The method of claim 11 wherein
the recording of said end indexing signal and said instruction indexing signal occurs on the same track of said plurality of tracks; and
the sensing of said end indexing signal includes suppressing signals on said track discreet from said end indexing signals.

14. The method of claim 1 further comprising the steps of
initially establishing exclusive control over said recording steps;
selectively generating an end indexing signal independent of voice-generated signals and discreet from said instruction indexing signal;
recording said end indexing signal in one of said plurality of tracks other than said first track; and
simultaneously with recording said end indexing signal, moving said medium in the forward direction;
sensing relinquishment of said control; and
upon said relinquishment moving said medium in a forward direction until the farthest point along said medium at which dictation signals are recorded in said first track is reached;
upon sensing said relinquishment of control and reaching said farthest point at which dictation is recorded generating an anti-reverse signal independent of voice-generated signals;
recording said anti-reverse signal in one of said plurality of tracks; and
simultaneously with recording said anti-reverse signal, moving said medium in the forward direction.

15. A method of recording dictation on a recording medium comprising the steps of:
moving said medium selectively in one of a forward direction and a reverse direction relative to a recording device;
recording voice-generated dictation signals on said recording medium while said medium is moving in the forward direction;
recording voice-generated instruction signals on said medium while said medium is moving in the forward direction;
at the termination of recording said instruction signals, returning said medium in the forward direction until the farthest point along said medium at which dictation signals have previously been recorded is reached at said recording device; and
during said instruction signal recording step and said returning step, disabling said recording of said dictation signals on said medium.

16. The method of claim 15 further comprising the step of
selectively re-enabling recording of dictation signals in said first track prior to said medium reaching the farthest point along said medium at which dictation signals have previously been recorded at said recording device.

17. The method of claim 15 wherein said step of moving said medium in the forward direction until the farthest point along said medium at which dictation signals have previously been recorded is reached at said recording device comprises
sensing movement of said medium in a reverse direction and the positioning of said medium at a point of advance prior to the point along said medium where said reverse movement began;
sensing said instruction signal recording step; and
upon the sensing of positioning of said medium at a point prior to the point along said medium where said reverse movement began and the sensing of said instruction signal recording step, moving said medium in the forward direction until the point along said medium at which said reverse movement began is reached at said recording device.

18. The method of claim 15 wherein said returning of said medium at the termination of recording said instruction signals is at a speed greater than the speed of motion of said medium during recording of said dictation and instruction signals.

19. The method of claim 15 wherein the step of recording voice-generated instruction signals on said medium occurs immediately after said medium has been moved in a reverse direction.

20. A method of recording and retrieving signals on a recording medium including a plurality of recording tracks comprising the steps of initially establishing exclusive control over a record/listen device;

moving said medium relative to said record/listen device in a forward direction;

recording voice-generated direction signals on a first track of said plurality of tracks while said medium is moving in a forward direction;

selectively moving said medium in a reverse direction relative to said record/listen device;

selectively recording an instruction indexing signal independent of voice-generated signals in a second track of said plurality of tracks following any sequence of forward and reverse moving of said medium relative to said record/listen device;

following recording of said instruction indexing signal, recording a voice generated instruction signal in one of said plurality of tracks other than said first track;

sensing relinquishment of said control over said record/listen device;

upon said relinquishment of control of the record/listen device moving said medium in a forward direction until the farthest point along said medium at which dictation signals are recorded in said first track is reached at said recording device;

sensing signals recorded in said plurality of tracks of said medium;

converting said voice-generated dictation signals sensed in said first track of said plurality of tracks into audible output signals corresponding to said voice-generated signals in said first track;

converting said instruction indexing signals sensed in said second track of said plurality of tracks into an audible output signal of a predetermined pitch and duration; and subsequently selectively converting said voice-generated instruction signals sensed in said one of said plurality of tracks other than said first into audible output signals corresponding to said voice-generated signals in said track.

21. The method of claim 20 wherein recording of said voice-generated instruction signals is in a third track of said plurality of tracks.

22. A method of recording dictation on a recording medium including a plurality of recording tracks, comprising the steps of initially establishing exclusive control over said recording device;

moving said medium relative to said recording device in a forward direction;

recording voice-generated dictation signals on a first track of said plurality of tracks while said medium is moving in a forward direction;

selectively moving said medium in a reverse direction relative to said recording device;

subsequent to said reverse moving of said medium again moving said medium in a forward direction while providing an audible output signal corresponding to the voice-generated signals recorded in said first track;

selectively recording an instruction indexing signal independent of voice-generated signals in a second track of said plurality of tracks following any sequence of forward and reverse moving of said medium relative to said recording device;

following recording of said instruction indexing signal, recording a voice generated instruction signal in one of said plurality of tracks other than said first track;

sensing relinquishment of said control over said recording device; and upon said relinquishment of control of said recording device, moving said medium in a forward direction until the farthest point along said medium at which dictation signals are recorded in said first track is reached at said recording device.

23. The method of claim 1 further comprising upon sensing said relinquishment of control and reaching said farthest point at which dictation is recorded the steps of generating an anti-reverse signal independent of voice-generated signals;

recording said anti-reverse signal in one of said plurality of tracks; and simultaneously with recording said anti-reverse signal, moving said medium in the forward direction.

24. The method of claim 23 further comprising the steps of sensing the process of an anti-reverse signal recorded on said medium; and disabling movement of said medium in a reverse direction in response to sensing an anti-reverse signal.

25. The method of claim 23 wherein the recording of said anti-reverse signal is in one of said plurality of tracks wherein no other signal is recorded.

* * * * *